United States Patent
Hishigae et al.

(10) Patent No.: US 11,919,341 B2
(45) Date of Patent: Mar. 5, 2024

(54) TIRE

(71) Applicant: BRIDGESTONE CORPORATION, Tokyo (JP)

(72) Inventors: Akira Hishigae, Tokyo (JP); Toru Hayashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 84 days.

(21) Appl. No.: 17/596,115

(22) PCT Filed: Jun. 15, 2020

(86) PCT No.: PCT/JP2020/023392
§ 371 (c)(1),
(2) Date: Dec. 3, 2021

(87) PCT Pub. No.: WO2020/255919
PCT Pub. Date: Dec. 24, 2020

(65) Prior Publication Data
US 2022/0242169 A1  Aug. 4, 2022

(30) Foreign Application Priority Data
Jun. 18, 2019  (JP) ................................ 2019-112964

(51) Int. Cl.
*B60C 9/22* (2006.01)
*B60C 9/00* (2006.01)

(52) U.S. Cl.
CPC .......... *B60C 9/2204* (2013.01); *B60C 9/0007* (2013.01)

(58) Field of Classification Search
CPC . B60C 9/22; B60C 9/2204; B60C 2009/2219; B60C 2009/2223
See application file for complete search history.

(56) References Cited

U.S. PATENT DOCUMENTS

| | | | |
|---|---|---|---|
| 2004/0089392 | A1 | 5/2004 | Yukawa et al. |
| 2013/0048185 | A1 | 2/2013 | Harikae et al. |
| 2013/0284337 | A1 | 10/2013 | Croissant |

(Continued)

FOREIGN PATENT DOCUMENTS

| | | |
|---|---|---|
| CN | 102950973 A | 3/2013 |
| CN | 103373177 A | 10/2013 |

(Continued)

OTHER PUBLICATIONS

International Search Report for PCT/JP2020/023392 dated, Sep. 1, 2020 (PCT/ISA/210).

(Continued)

*Primary Examiner* — Justin R Fischer
(74) *Attorney, Agent, or Firm* — Sughrue Mion, PLLC (57) ABSTRACT

A pneumatic tire is provided with a belt layer and a reinforcing layer provided outside the belt layer in tire radial direction. The reinforcing layer has an inner reinforcing layer in which a strip member having a plurality of cords is wound along tire circumferential direction, and an outer reinforcing layer in which the strip member having a plurality of cords is wound along the tire circumferential direction and is provided outside tire radial direction of the inner reinforcing layer. The outer reinforcing layer has a gap between adjacent strip members in tire width direction.

2 Claims, 5 Drawing Sheets

(56) References Cited

U.S. PATENT DOCUMENTS

| | | | |
|---|---|---|---|
| 2014/0332130 A1 | 11/2014 | Maehara | |
| 2015/0336345 A1 | 11/2015 | Maehara | |
| 2017/0274710 A1 | 9/2017 | Matsumoto et al. | |
| 2018/0056721 A1 | 3/2018 | Tochiki | |
| 2020/0148005 A1* | 5/2020 | Tsukamoto | ......... B60C 15/0603 |

FOREIGN PATENT DOCUMENTS

| | | | |
|---|---|---|---|
| CN | 107791750 A | | 3/2018 |
| EP | 0 414 470 A2 | | 2/1991 |
| EP | 1 167 003 A2 | | 1/2002 |
| EP | 2657047 A2 | | 10/2013 |
| JP | 3-82604 A | | 4/1991 |
| JP | 2001-322405 A | | 11/2001 |
| JP | 4901144 | * | 3/2012 |
| JP | 2013-220755 A | | 10/2013 |
| JP | 5977566 | * | 8/2016 |
| WO | 02/102610 A1 | | 12/2002 |
| WO | 2014/181705 A1 | | 11/2014 |

OTHER PUBLICATIONS

Search Report dated Aug. 17, 2022 issued in Chinese Application No. 202080043082.1.
Extended European Search Report dated Jun. 7, 2023 in European Application No. 20827760.8.

\* cited by examiner

TIRE

CROSS REFERENCE TO RELATED APPLICATIONS

This application is a National Stage of International Application No. PCT/JP2020/023392 filed Jun. 15, 2020, claiming priority based on Japanese Patent Application No 2019-112964 filed Jun. 18, 2019.

TECHNICAL FIELD

The present invention relates to a tire suitable for sport driving.

BACKGROUND ART

Conventionally, a pneumatic tire (hereinafter abbreviated as tire) having a reinforcing layer provided on the outside of a pair of crossing belt in a tire radial direction is known (Patent literature 1). The reinforcing layer is formed by a strip-like member (strip member) in which a plurality of cords are rubbed is wound around along tire circumferential direction.

According to tire, since the diameter growth of the tire due to the centrifugal force generated during high-speed driving is suppressed, steering stability during high-speed driving is improved.

CITATION LIST

Patent Literature

[PTL 1] Japanese Unexamined Patent Application Publication No. 2001-322405

SUMMARY OF INVENTION

According to the tire described above, steering stability in high-speed driving is improved, but in recent years, as the performance of vehicles is improved, it has been demanded from the market that the improvement of steering stability in high-speed driving and the improvement of gripping force of the road surface can be made at a higher level especially in a tire used for sporting driving. It is also important to improve the life of tire, especially when the tire is used by average users, even in the case of sporting driving.

Accordingly, an object of the present invention is to provide a tire in which gripping force is further improved while extending the life of tire.

One aspect of the present invention is a tire (pneumatic tire 10) including a belt layer (belt layer 50) extending along a tire circumferential direction and extending from one end to other end in a tire width direction, and a reinforcing layer (For example, reinforcing layer 100) provided on the outer side of the belt layer in a tire radial direction. The reinforcing layer comprises an inner reinforcing layer (inner reinforcing layer 110) in which strip members (strip members 111) having a plurality of cords (cords 112) are wound along the tire circumferential direction, and an outer reinforcing layer (outer reinforcing layer 120) provided outside in the tire circumferential direction of the inner reinforcing layer, in which strip members (strip members 121) having a plurality of cords (cords 122) are wound along the tire radial direction. At least either the inner reinforcing layer or the outer reinforcing layer has a gap (gap G1) between the strip members adjacent to each other in the tire width direction.

DESCRIPTION OF EMBODIMENTS

Embodiments will be described below with reference to the drawings. The same functions and configurations are denoted by the same or similar reference numerals, and descriptions thereof are omitted as appropriate.

(1) OVERALL STRUCTURE OF TIRE

Figure 1:
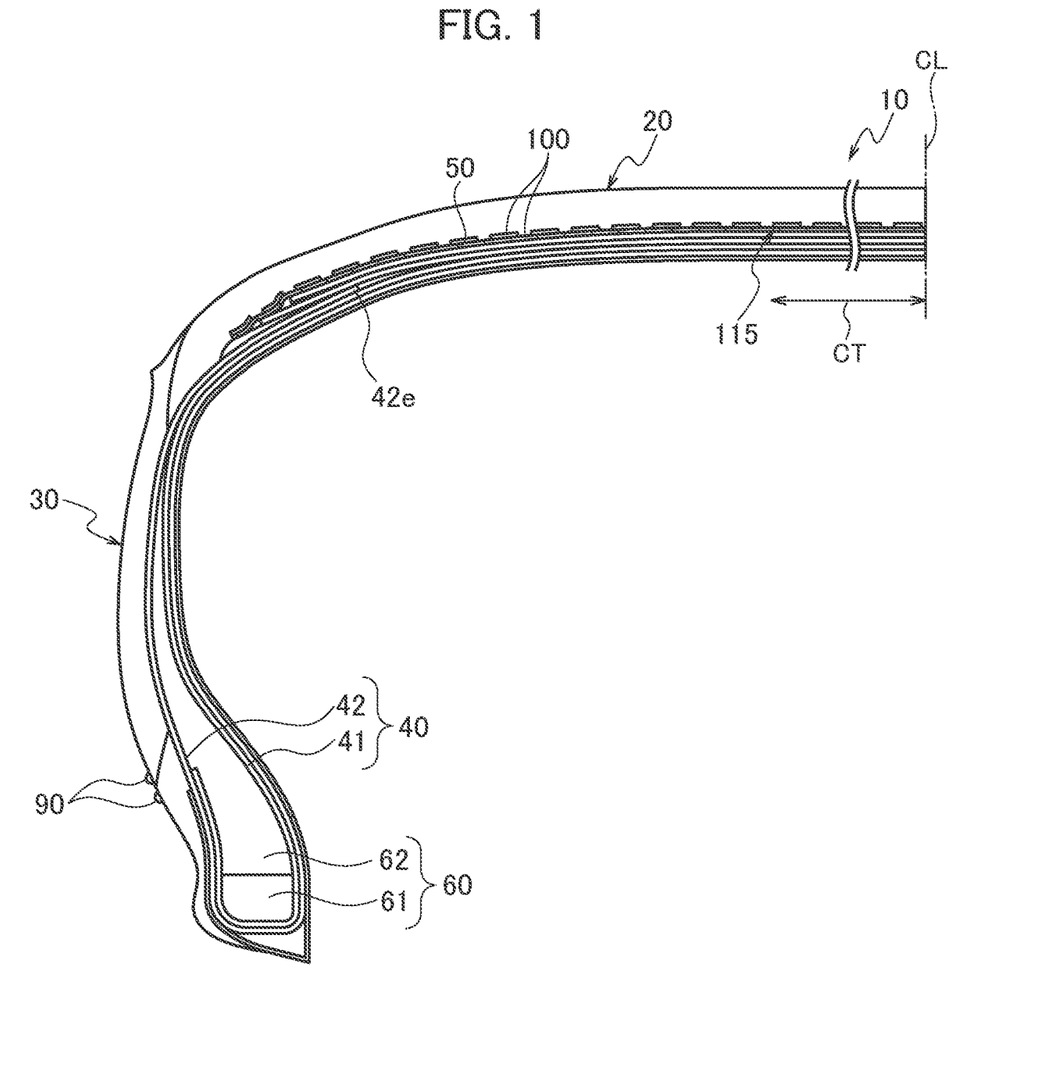
FIG. 1 is a cross-sectional view of a pneumatic tire 10.

FIG. 1 is a cross-sectional view of a pneumatic tire 10 according to the present embodiment. Specifically, FIG. 1 is a cross-sectional view of the pneumatic tire 10 taken along tire width direction and tire radial direction. In FIG. 1, the sectional hatching is not shown (hereinafter the same).

As shown in FIG. 1, the pneumatic tire 10 includes a tread 20, a tire side portion 30, a carcass 40, a belt layer 50, a bead portion 60, and a reinforcing layer 100.

In the present embodiment, the pneumatic tire 10 is a tire that is assumed to be mounted on a four-wheel vehicle, specifically a passenger vehicle. In particular, the pneumatic tire 10 may be suitably used for a four-wheel vehicle, such as a sports type four-wheel vehicle, suitable for sport driving (including a racetrack).

The tread 20 is a portion in contact with the road surface. On the tread 20, a pattern (not shown) is formed according to the usage environment of the pneumatic tire 10 and the type of vehicle to be mounted.

The tire side portion 30 is continuous to the tread 20 and positioned inside in the tire radial direction of the tread 20. The tire side portion 30 is an area from the tire width direction outer end of the tread 20 to the upper end of bead portion 60. The tire side portion 30 is sometimes referred to as a sidewall.

The carcass 40 forms the skeleton of the pneumatic tire 10. The carcass 40 has a radial structure in which a carcass cord (not shown) arranged radially along tire radial direction is covered with a rubber material. However, the present invention is not limited to a radial structure, and may be a bias structure in which the carcass cords are arranged so as to cross each other in the tire radial direction. The carcass 40 has a body portion 41 and a folded portion 42.

The body portion 41 extends over the tread 20, the tire side portion 30 and the bead portion 60 until it is folded back at the bead portion 60.

The folded portion 42 is a portion continuous to the body portion 41 and folded back to the outside in the tire width direction via a bead core 61. An outer end 42 e of the folded portion 42 in the tire radial direction extends to the inside in the tire radial direction of the belt layer 50. That is, the carcass 40 has an envelope structure.

However, the carcass 40 need not necessarily have an envelope structure, and for example, the outer end 42 e does not reach the belt layer 50, but may have a high-turn-up structure positioned inside in the tire radial direction of the belt layer 50, specifically, near the maximum width of the tire side portion 30.

The carcass cord is formed of an organic fiber such as nylon as in the case of a tire for standard four-wheel vehicles. In the present embodiment, the carcass 40 is formed of a plurality of plies (carcass plies).

The belt layer 50 is provided inside in the tire radial direction of the tread 20, specifically inside in the tire radial direction of the reinforcing layer 100.

The belt layer 50 is provided from one end to the other end in the tire width direction of the tread 20. Specifically, the belt layer 50 is provided from one shoulder portion 21 (not shown in FIG. 1, see FIG. 2) to the other shoulder portion (not shown) of the tread 20. The shoulder portion may be defined as an area including a boundary between the tread 20 and tire side portion 30.

In this embodiment, the belt layer 50 is formed by a pair of crossing belt with crossing cords (not shown) made of metal, such as steel. However, the belt layer 50 may not necessarily be formed by a crossing belt. If the carcass 40 has a bias structure, the belt layer 50 need not be provided.

For example, the belt layer 50 may be a single layer spiral belt with a reinforcing cord formed of a metallic material (for example, steel) coated with a resin. That is, the belt layer 50 may be provided outside in the tire radial direction of the carcass 40, so long as the structure contributes to generation of a cornering force (CF), securing of rigidity of the carcass 40, and the like, when a slip angle is applied to the pneumatic tire 10.

The belt layer 50 may also be less rigid than a belt layer used in a typical pneumatic tire of the same type. Specifically, the belt layer 50 may have a lower in-belt please shear stiffness (may simply be referred to as in-plane shear rigidity) of the pair of crossing belt than a crossing belt typically used in the same type of a pneumatic tire. The belt layer 50 contributes to an increase in ground contact area of the tread 20.

The belt layer 50 is therefore easily deformed by an external force, but is required to be strong against twisting. For example, by making the diameter (wire diameter) of the cords that make up the belt layer 50 smaller than a crossing belt layer used in a typical pneumatic tire of the same type, such characteristics can be imparted to the belt layer 50.

The bead portion 60 is continuous to the tire side portion 30 and is positioned inside in the tire radial direction of the tire side portion 30. The bead portion 60 is an annular shape extending to tire circumferential direction and is locked to a rim wheel (not shown). The bead portion 60 includes a bead core 61 and a bead filler 62.

The bead core 61 is formed by twisting a plurality of metal cords. For example, the bead core 61 may be formed of steel cords. The number of cords (number of cores) is not particularly limited.

The bead filler 62 is provided outside in the tire radial direction of the bead core 61. The bead filler 62 is formed by using rubber (or resin) harder than other parts formed by using rubber. The bead filler 62 is provided to fill a space having wedge-shaped in cross-sectional shape formed by the body portion 41 and the folded portion 42 of the carcass 40. The bead filler 62 may be referred to as a stiffener.

A rim line 90 is provided on an outside in the tire width direction of the bead portion 60. The rim line 90 is a projection formed along the tire circumferential direction to confirm that the bead portion 60 is correctly mounted on the rim wheel.

The reinforcing layer 100 is provided outside in the tire radial direction of the belt layer 50. Specifically, the reinforcing layer 100 is provided inside in the tire radial direction of the tread 20.

The reinforcing layer 100 has a two-layer structure of a layer (which may be called a ply) provided inside in the tire radial direction and a layer provided outside in the tire radial direction. The reinforcing layer 100 is formed by winding a strip member in which a plurality of cords are rubbed a plurality of times along tire circumferential direction.

The reinforcing layer 100 may also be referred to as a cap, a layer, or cap and layer, and the like.

Figure 2:
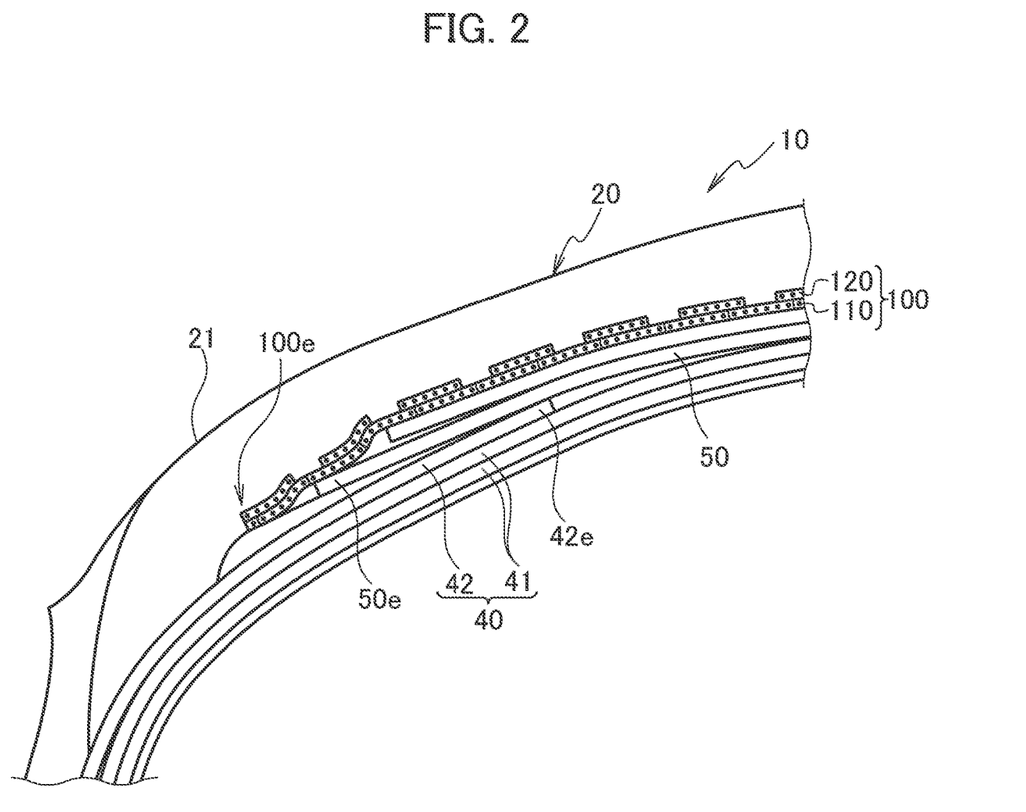
FIG. 2 is a partially enlarged cross-sectional view of the pneumatic tire 10 including a shoulder portion of a tread 20.

FIG. 2 is a partially enlarged sectional view of the pneumatic tire 10 including a shoulder portion of the tread 20. As shown in FIG. 2, the reinforcing layer 100 includes an inner reinforcing layer 110 and an outer reinforcing layer 120.

The inner reinforcing layer 110 and the outer reinforcing layer 120 are formed by winding a strip member having a plurality of cords along the tire circumferential direction.

The outer reinforcing layer 120 is provided outside in the tire radial direction of the inner reinforcing layer 110. In the inner reinforcing layer 110, adjacent strip members in the tire width direction are closely attached. On the other hand, in the outer reinforcing layer 120, gaps (space) are provided between adjacent strip members in the tire width direction. That is, in the outer reinforcing layer 120, the strip members are spaced apart in the tire width direction.

The reinforcing layer 100 is provided up to a shoulder portion 21 of the tread 20. The reinforcing layer 100 is positioned outside in the tire width direction than an end portion 50 e of the belt layer 50.

The reinforcing layer 100 is provided so as to overlap the folded portion 42 of the carcass 40 in the tire width direction. Specifically, an outer end 42 e of the folded portion 42 is positioned inside in the tire width direction than an end portion 100 e of the reinforcing layer 100.

(2) SHAPE OF THE REINFORCING LAYER

Figure 3:
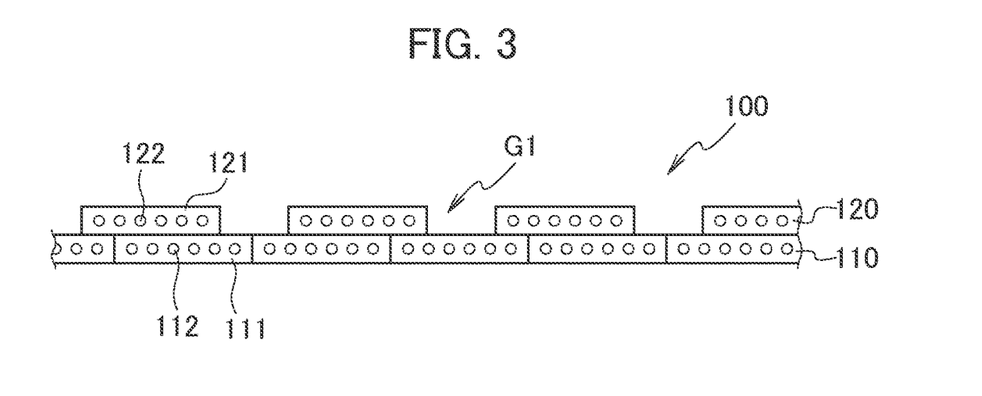
FIG. 3 is a partially enlarged cross-sectional view of a reinforcing layer 100.

FIG. 3 is a partially enlarged cross-sectional view of the reinforcing layer 100. Specifically, FIG. 3 is a partially enlarged cross-sectional view of the reinforcing layer 100 of the pneumatic tire 10 along the tire width direction and the tire radial direction.

As shown in FIG. 3, in the present embodiment, the reinforcing layer 100 is formed by the inner reinforcing layer 110 and the outer reinforcing layer 120.

The inner reinforcing layer 110 is formed by winding a strip member 111 spirally wound along the tire circumferential direction at the tire radial direction outside of the belt layer 50.

The outer reinforcing layer 120 is formed by a strip member 121 spirally wound along the tire circumferential direction at the tire radial direction outside of the inner reinforcing layer 110.

The strip member 111 is formed by covering a plurality of cords 112 with a rubber material. Similarly, the strip member 121 is formed by coating a plurality of cords 122 with a rubber material. The cords 112 and 122 may be formed of organic fibers or metal, such as or steel. In the case of the organic fiber, for example, polyester, aramid fiber or the like can be used.

In this embodiment, the strip member 111 is formed of 6 pieces of the cords 112. Similarly, the strip member 121 is formed of 6 pieces of the cords 122. The number of cords 112 forming the strip member 111 and the number of cords 122 forming the strip member 121 are not limited to 6, and may be more than 6 or less than 6.

In some portion in the tire width direction, such as the end portion 100 e (see FIG. 2), the number of cords 112 forming the strip member 111 or the number of cords 122 forming the strip member 121 may be smaller.

In this embodiment, the inner reinforcing layer 110 is provided with strip members 111 continuously throughout the entire area in the tire width direction (see also FIGS. 1 and 2). That is, no gap is provided between the adjacent strip members 111.

On the other hand, the outer reinforcing layer 120 has a gap G1 between adjacent strip members 121 in the tire width direction. That is, the strip member 121 is spirally wound along the tire circumferential direction with the gap G1.

In the present embodiment, the plurality of gaps G1 are all the same and do not vary. The outer reinforcing layer 120 may also have at least the gap G1 in a central region CT (see FIG. 1) in the tire width direction including a tire equatorial line CL. That is, in a region other than the central region CT in the tire width direction, for example, a region closer to the shoulder portion 21 (see FIG. 2), the outer reinforcing layer 120 may not have the gap G1.

In the present embodiment, the center region CT is defined as a region from the tire equatorial line CL up to 30% of a half (TW/2) of the tread width (TW) of the pneumatic tire 10.

Further, in the present embodiment, as described above, the inner reinforcing layer 110 is provided with the strip members 111 continuously throughout in the tire width direction, but the inner reinforcing layer 110 may have a continuous portion 115 (see FIG. 1) in which the strip members 111 are provided continuously at least in the center region CT without the gap G1.

As shown in FIG. 3, the width of the gap G1 may be narrower than the width of the strip member 121. In this embodiment, the width of the strip member 111 and the strip member 121 along the tire width direction is about 6 mm. The width of the gap G1 along the tire width direction is about 3 mm.

The gap G1 and the width of the strip member 121 preferably have a relationship of about 1:2.

(3) MODIFIED EXAMPLES

Next, modified example of the reinforcing layer 100 will be described. Specifically, with reference to FIGS. 4 to 7, the structure of the reinforcing layer 100 A, the reinforcing layer 100 B, the reinforcing layer 100 C, and the reinforcing layer 100 D according to modified example will be described. Hereinafter, the different portions from the reinforcing layer 100 will be mainly described.

(3.1) Modified Example 1

Figure 4:
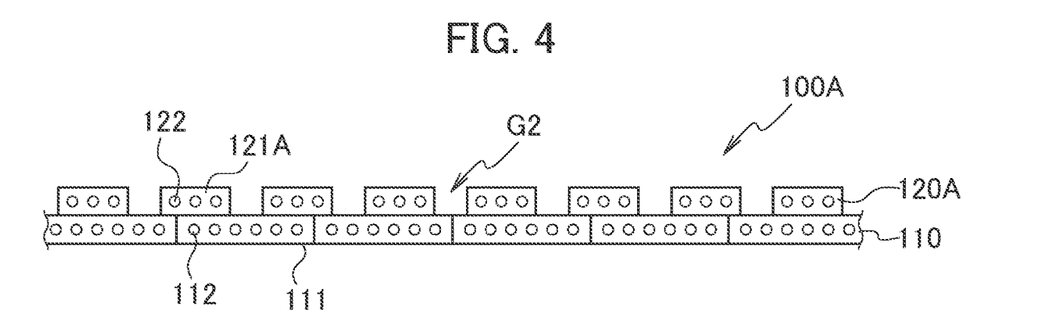
FIG. 4 is partially enlarged cross-sectional view of a reinforcing layer 100 A according to modified example.

FIG. 4 is a partially enlarged cross-sectional view of the reinforcing layer 100 A according to modified example. As shown in FIG. 4, the reinforcing layer 100 A is formed of the inner reinforcing layer 110 and an outer reinforcing layer 120 A.

The outer reinforcing layer 120 A is formed of a strip member 121 A. The strip member 121 A has a smaller number of cords 122 than the strip member 121 forming the outer reinforcing layer 120 of the reinforcing layer 100, and is formed of 3 pieces of cords 122.

A gap G2 is provided in the strip members 121 A adjacent to each other in the tire width direction. The gap G2 is preferably narrower than the width of the strip member 121 A along the tire width direction.

Further, as in the case of the reinforcing layer 100 A, the number (6) of cords 112 forming the strip member 111 may be different from the number (3) of cords 122 forming the strip member 121 A. The number of cords 122 forming the strip member 121 A may be larger or smaller than the number of cords 112 forming the strip member 111.

According to the reinforcing layer 100 A, the rigidity of the reinforcing layer 100 A can be easily adjusted, and the suppression of the diameter growth of the pneumatic tire 10 and the increase of ground contact area can be realized in a good balance.

(3.2) Modified Example 2

Figure 5:
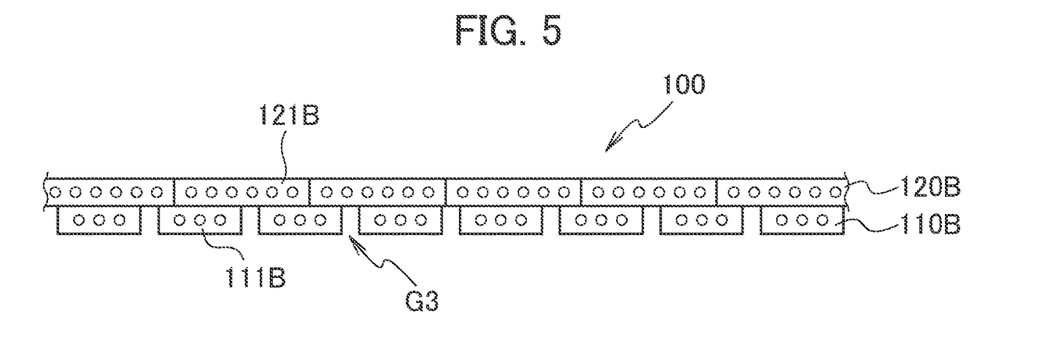
FIG. 5 is partially enlarged cross-sectional view of a reinforcing layer 100 B according to modified example.

FIG. 5 is a partially enlarged cross-sectional view of the reinforcing layer 100 B according to modified example. As shown in FIG. 5, the reinforcing layer 100 B is formed of an inner reinforcing layer 110 B and an outer reinforcing layer 120 B.

The inner reinforcing layer 110 B has a gap G3 between adjacent strip members 111 B in the tire width direction. That is, the strip member 111 B is spirally wound along the tire circumferential direction with the gap G3.

On the other hand, in the outer reinforcing layer 120 B, a strip member 121 B is continuously provided throughout the tire width direction. That is, no gap is provided between the adjacent strip members 121 B.

As in the case of the reinforcing layer 100 B, the gap G3 may be provided in the inner reinforcing layer 120 B instead of the outer reinforcing layer 110 B.

According to the reinforcing layer 100 B, since the outer reinforcing layer 120 B having no gap is provided on the outside in the tire radial direction of the inner reinforcing layer 110 B, the ground contact area can be increased while surely suppressing the diameter growth of the pneumatic tire 10.

(3.3) Modified Example 3

Figure 6:
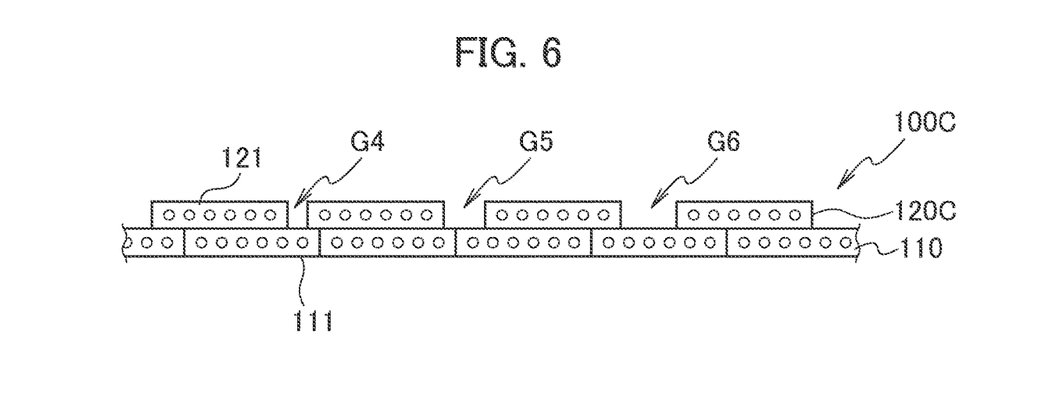
FIG. 6 is partially enlarged cross-sectional view of a reinforcing layer 100 C according to modified example.

FIG. 6 is a partially enlarged cross-sectional view of the reinforcing layer 100 C of modified example. As shown in FIG. 6, the reinforcing layer 100 C is formed of an inner reinforcing layer 110 and an outer reinforcing layer 120 C.

The inner reinforcing layer 110, like the reinforcing layer 100, is formed of the strip member 111. On the other hand, the outer reinforcing layer 120 C, like the reinforcing layer 100, is formed of the strip member 121, but the gap between the strip members 121 is different.

Specifically, the outer reinforcing layer 120 C has a plurality of different gaps. More specifically, a gap G4, a gap G5, and a gap G6 are provided. The gap G5 is wider than the gap G4, and the gap G6 is wider than the gap G5. That is, the gap G4, the gap G5, and the gap G6 have the relationship of G4<G5<G6.

The gap G4 is provided closer to the shoulder portion 21 (see FIG. 2), and the gap G6 is provided closer to the tire equatorial line CL. That is, the gap between the strip members may increase from the shoulder portion 21 toward the tire equatorial line CL. Alternatively, the gap between the strip members in the center region CT may be wider than the gap between the strip members in a region other than the center region CT (for example, shoulder portion 21).

The reinforcing layer 100 C can increase ground contact area in the center region of the pneumatic tire 10 while suppressing the diameter growth of the shoulder portion of the pneumatic tire 10.

(3.4) Modified Example 4

Figure 7:
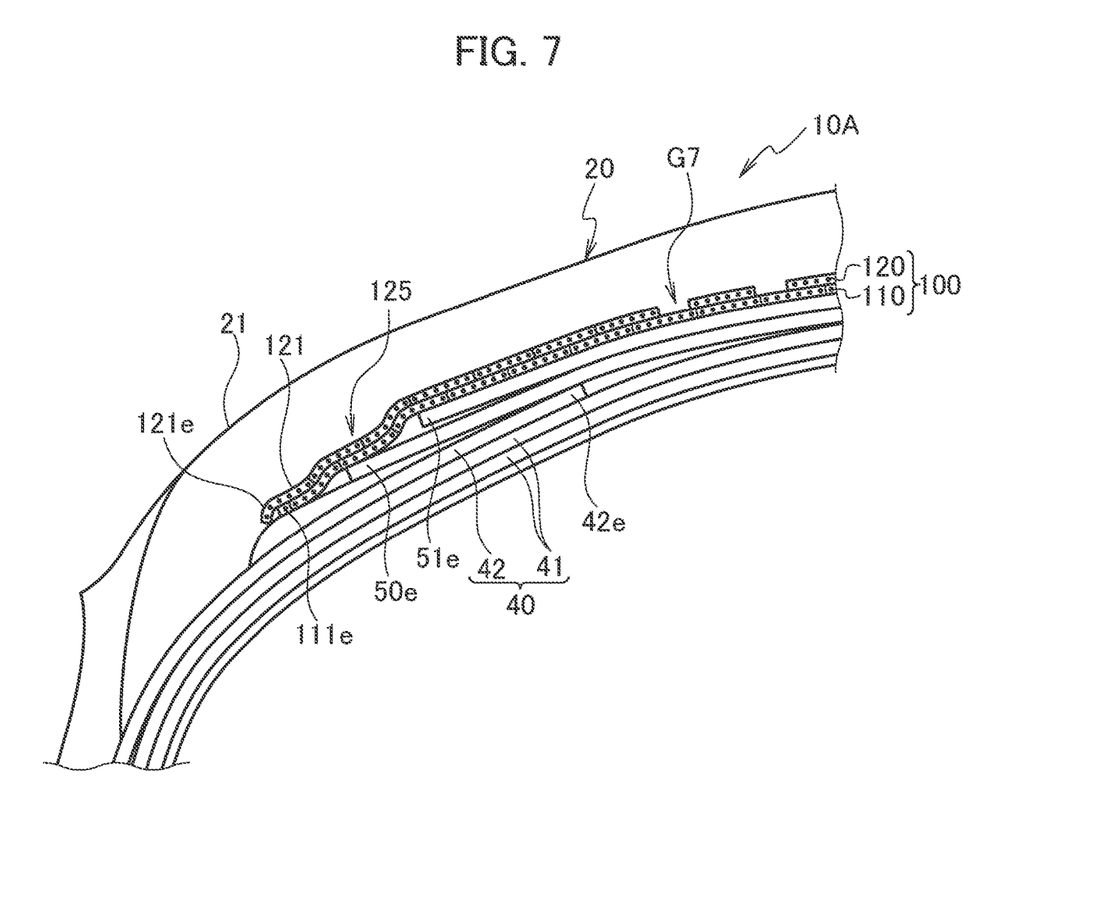
FIG. 7 is partially enlarged cross-sectional view of a pneumatic tire 10 A including the shoulder portion of the tread 20 according to modified example.

FIG. 7 is a partially enlarged cross-sectional view of a pneumatic tire 10 A including a shoulder portion of the tread 20 according to modified example. As shown in FIG. 7, the reinforcing layer 100 D of pneumatic tire 10 A is formed of an inner reinforcing layer 110 and an outer reinforcing layer 120 D.

The outer reinforcing layer 120 D has a continuous portion 125 in which the strip member 121 is continuously provided in the shoulder portion 21 without a gap G7. On the other hand, the outer reinforcing layer 120 D has the gap G7 between the strip members 121 adjacent to each other in the tire width direction in the region other than the shoulder portion 21, for example, near the tire equatorial line CL (see FIG. 1).

The region in which the continuous portion 125 is formed is not particularly limited to the shoulder portion 21, but the continuous portion 125 is preferably formed in a region overlapping the end portion 50 $e$ of the belt layer 50 in the tire width direction.

Furthermore, if, as in modified example, the belt layer 50 is formed of a pair of crossing belt, the continuous portion 125 is preferably formed to cover both the end portion 50 $e$ in the tire width direction of the inner belt (which may be referred to as the first belt) forming the pair of crossing belt and an end portion 51 $e$ in the tire width direction of the outer belt (which may be referred to as the second belt) forming the pair of crossing belt.

The continuous portion 125 may be formed so as to cover not only the end portion 50 $e$ and the end portion 51 $e$ but also the outer end 42 $e$ of the folded portion 42 of the carcass 40.

Further, like the reinforcing layer 100 D, the width of the outer reinforcing layer 120 D along the tire width direction may be wider than the width of the inner reinforcing layer 110 along the tire width direction. That is, An end portion 121 $e$ in the tire width direction of the outer reinforcing layer 120 D may be positioned outside of an end 110 $e$ in the tire width direction of the inner reinforcing layer 111.

(4) FUNCTION AND EFFECTS

According to the embodiment described above, the following effects can be obtained. Specifically, the pneumatic tire 10 is provided with the reinforcing layer 100 having an inner reinforcing layer 110 around which the strip member 111 is wound along the tire circumferential direction and the outer reinforcing layer 120 around which the strip member 121 is wound along the tire circumferential direction. The outer reinforcing layer 120 has the gap G1 between the strip members 121.

Since the gap G1 is formed between the strip members 121 of the outer reinforcing layer 120, the rigidity of the outer reinforcing layer 120 is lower than that of the inner reinforcing layer 110, and the restricting force of the belt layer 50 is weakened. This increases ground contact area of the tread 20.

Specifically, ground contact area is increased, particularly in the tire circumferential direction, as compared to the case where no gap G1 is formed. That is, the out-of-plane rigidity in the circumferential direction of the tread 20 is reduced, and ground contact area is increased.

As ground contact area of the tread 20 increases, the friction between the tread 20 and the road surface increases, and gripping force of the road surface of the pneumatic tire 10 can be improved. Note that gripping force may mean the sum of longitudinal force (Fx, braking and driving forces) and lateral forces (Fy, force required to travel on curve), or more simply, the so-called friction circle indicated by Fx and Fy.

Further, since gripping force can be enhanced by the increase of ground contact area, the rubber used for the tread 20 need not be a material exhibiting a high gripping force but rapid progress of wear.

The reinforcing layer 100 is formed by winding a strip member along the tire circumferential direction at outside in tire radial direction of the belt layer 50. Therefore, since the diameter growth of the pneumatic tire 10, specifically, the belt layer 50 due to centrifugal force generated during high-speed traveling is suppressed, steering stability during high-speed traveling is improved.

In particular, in a four-wheel vehicle such as a sports type four-wheel vehicle, suitable for sport driving (including a racetrack), since the vehicle is driven at high speed, it is important to suppress the diameter growth of belt layer 50. Further, since the rigidity of the belt layer 50 is improved by the reinforcing layer 100, the responsiveness when the slip angle is applied to the pneumatic tire 10 is improved.

In other words, according to the pneumatic tire 10, while extending the life of tire, gripping force can be further improved. Incidentally, according to the reinforcing layer 100, although the outer reinforcing layer 120 has the gap G1, the lowering steering stability due to the diameter growth of the belt layer 50 can be prevented because of the two-layer structure with the inner reinforcing layer 110. Further, since the gap G1 can suppress the weight increase of the pneumatic tire 10, it can also contribute to the reduction of rolling resistance.

The outer reinforcing layer 120 may have at least the gap G1 in the center region CT including tire equatorial line CL. Thus, ground contact area can be effectively increased in the center region CT that contributes to substantial ground contact area increase. Thus, gripping force can be further improved.

On the other hand, the inner reinforcing layer 110 has a continuous portion 115 in which the strip members 111 are continuously provided at least in the center region CT without a gap. Therefore, the diameter growth of the belt layer 50 in the center region CT having a large influence on steering stability can be effectively suppressed. In addition, gaps may be provided in areas other than the center region CT of the inner reinforcing layer 110. Thus, the weight increase of the pneumatic tire 10 can be suppressed, and steering stability during high-speed traveling can be improved.

As shown in the modified example 4, the outer reinforcing layer 120 D has the continuous portion 125 in which the strip members 121 are continuously provided without the gap G7 in a region overlapping the end portion 50 $e$ and the end portion 51 $e$ of belt layer 50. Therefore, the reinforcing layer 100 D can surely suppress the diameter growth of the belt layer 50 near the end portion 50 $e$ and the end portion 51 $e$. Thus, steering stability can be further improved during high-speed traveling.

Further, as with the reinforcing layer 100 and the like described above, the width of the gap G1 may be narrower than the width of the strip member 111 and the strip member 121. By making the width of the gap G1 narrower than the width of the strip member 111 and the strip member 121, the suppression of the diameter growth of the belt layer 50 and the increase of ground contact area can be achieved in a good balance. As a result, steering stability and gripping force can be improved at a high level.

In this embodiment, the belt layer 50 may have a lower rigidity than a typical pneumatic tire of the same type. On the other hand, the belt layer 50 is easily deformed by an external force, but it may be strong for twisting. According to the belt layer 50, in particular, the rigidity of the tread 20 can be reduced when a load is applied to the pneumatic tire 10, thereby contributing to an increase in ground contact area.

Further, according to the combination of the belt layer 50 and the outer reinforcing layer 120 having the gap G1, the rigidity of the tread 20 is not too low when the pneumatic tire 10 is twisted due to cornering or the like. Therefore, damage due to excessive deformation of the tread 20 can be prevented. As a result, the improvement of steering stability and gripping force can be achieved at a higher level.

(5) OTHER EMBODIMENTS

Although the contents of the present invention have been described above with reference to the examples, it will be obvious to those skilled in the art that the present invention is not limited to these descriptions and that various modifications and improvements are possible.

For example, in the embodiment described above, although the pneumatic tire 10 may be suitably used for a four-wheel vehicle, such as a sports type four-wheel vehicle, suitable for sport driving (including a racetrack), the pneumatic tire 10 is not limited to such a four-wheel vehicle, and the pneumatic tire 10 may be used for different types of vehicles, such as a conventional passenger vehicle (including SUV: sport utility vehicles).

Although the term strip member has been used in the above-described embodiments, it may be simply referred to as a strip. The reinforcing layer may also be referred to as a reinforcing belt layer, a spiral belt layer, or simply a reinforcing belt.

While embodiments of the invention have been described as above, it should not be understood that the statements and drawings which form part of this disclosure are intended to limit the invention. Various alternative embodiments, examples and operating techniques will become apparent to those skilled in the art from this disclosure.

REFERENCE SIGNS LIST 10 pneumatic tire
20 tread
21 shoulder section
30 tire side portion
40 carcass
41 body portion
42 folding section
42 e outer end
50 belt layer
50 e, 51 e end portion
60 bead portion
61 bead core
62 bead filler
90 rim line
100, 100 A to 100 D reinforcing layer
100 e end portion
110, 110 B inner reinforcing layer
111, 111 B strip member
111 e end portion
112 cord
115 continuous portion
120, 120 A to 120 D outer reinforcing layer
121, 121 A, 121 B strip member
121 e end portion
122 cord
125 continuous portion
G1 to G7 gap

The invention claimed is:

1. A tire comprising:
a belt layer extending along a tire circumferential direction and extending from one end to other end in a tire width direction; and
a reinforcing layer provided on the outer side of the belt layer in a tire radial direction, wherein
the reinforcing layer comprises:
an inner reinforcing layer in which strip members having a plurality of cords are wound along the tire circumferential direction; and
an outer reinforcing layer provided outside in the tire radial direction of the inner reinforcing layer, in which strip members having a plurality of cords are wound along the tire circumferential direction, wherein
at least either the inner reinforcing layer or the outer reinforcing layer has a gap between the strip members adjacent to each other in the tire width direction
the outer reinforcing layer has at least the gap in a central region in the tire width direction, which is a region from a tire equatorial line up to 30% of a half (TW/2) of a tread width,
the inner reinforcing layer has a continuous portion at least in the center region, in which the strip members are continuously provided without the gap,
the gap and the width of the strip members have a relationship of 1:2, and
a number of the cords forming the strip members of the outer reinforcing layer is smaller than a number of the cords forming the strip members of the inner reinforcing layer.

2. The tire according to claim 1, wherein the outer reinforcing layer has a continuous portion in which the strip members are continuously provided without the gap in a region overlapping an end of the of belt layer in the tire width direction.

\* \* \* \* \*